(12) United States Patent
Kendall et al.

(10) Patent No.: US 9,120,555 B2
(45) Date of Patent: Sep. 1, 2015

(54) ACTIVE DIHEDRAL CONTROL SYSTEM FOR A TORISIONALLY FLEXIBLE WING

(75) Inventors: Greg T. Kendall, Glendale, CA (US);
Derek L. Lisoski, Simi Valley, CA (US);
Walter R. Morgan, Simi Valley, CA (US); John A. Griecci, Redondo Beach, CA (US)

(73) Assignee: AeroVironment Inc., Monrovia, CA (US)

( * ) Notice: Subject to any disclaimer, the term of this patent is extended or adjusted under 35 U.S.C. 154(b) by 973 days.

(21) Appl. No.: 12/804,988

(22) Filed: Aug. 2, 2010

(65) Prior Publication Data
US 2010/0308161 A1 Dec. 9, 2010

Related U.S. Application Data

(60) Division of application No. 11/732,109, filed on Apr. 2, 2007, now Pat. No. 7,802,756, which is a continuation-in-part of application No. 10/310,415, filed on Dec. 5, 2002, now Pat. No. 7,198,225, which (Continued)

(51) Int. Cl.
*B64C 3/38* (2006.01)
*B64C 17/00* (2006.01)
(Continued)

(52) U.S. Cl.
CPC . *B64C 17/00* (2013.01); *B64C 3/38* (2013.01); *B64C 3/42* (2013.01); *B64C 3/52* (2013.01); *B64C 15/02* (2013.01); *B64C 39/024* (2013.01); *B64C 39/10* (2013.01); *B64D 27/24* (2013.01); *B64D 31/06* (2013.01); *H04B 7/18504* (2013.01); *B64C 2201/028* (2013.01);

(Continued)

(58) Field of Classification Search
USPC .............................................. 244/45 R, 124
See application file for complete search history.

(56) References Cited

U.S. PATENT DOCUMENTS 1,288,384 A 12/1918 Coakley
1,815,341 A 7/1931 Zaharoff
(Continued)

FOREIGN PATENT DOCUMENTS

DE 582542 1/1934
DE 648122 7/1937
(Continued)

OTHER PUBLICATIONS

Flittie, K. and Curtin, B., "Pathfinder Solar-Powered Aircraft Flight Performance," AIAA Paper 98/4446, Aug. 1998, pp. 618-632.*
(Continued)

*Primary Examiner* — Tien Dinh
*Assistant Examiner* — Michael A Fabula
(74) *Attorney, Agent, or Firm* — Eric J. Aagaard, Esq.; The Law Office of John A. Griecci

(57) ABSTRACT

A span-loaded, highly flexible flying wing, having horizontal control surfaces mounted aft of the wing on extended beams to form local pitch-control devices. Each of five spanwise wing segments of the wing has one or more motors and photovoltaic arrays, and produces its own lift independent of the other wing segments, to minimize inter-segment loads. Wing dihedral is controlled by separately controlling the local pitch-control devices consisting of a control surface on a boom, such that inboard and outboard wing segment pitch changes relative to each other, and thus relative inboard and outboard lift is varied.

20 Claims, 5 Drawing Sheets

Related U.S. Application Data is a division of application No. 09/527,544, filed on Mar. 16, 2000, now abandoned, application No. 12/804,988, which is a continuation-in-part of application No. 10/600,258, filed on Jun. 20, 2003, now Pat. No. 7,281,681, which is a continuation-in-part of application No. 10/073,828, filed on Feb. 11, 2002, now abandoned, which is a division of application No. 09/826,424, filed on Apr. 3, 2001, now Pat. No. 6,550,717.

(60) Provisional application No. 60/182,165, filed on Feb. 14, 2000, provisional application No. 60/241,713, filed on Oct. 18, 2000, provisional application No. 60/194,137, filed on Apr. 3, 2000.

(51) Int. Cl.

| | | |
|---|---|---|
| *B64C 3/42* | (2006.01) | |
| *B64C 3/52* | (2006.01) | |
| *B64C 15/02* | (2006.01) | |
| *B64C 39/02* | (2006.01) | |
| *B64C 39/10* | (2006.01) | |
| *B64D 27/24* | (2006.01) | |
| *B64D 31/06* | (2006.01) | |
| *H04B 7/185* | (2006.01) | |

(52) U.S. Cl.
CPC ..... *B64C2201/042* (2013.01); *B64C 2201/102* (2013.01); *B64C 2201/122* (2013.01); *B64C 2201/126* (2013.01); *B64C 2201/127* (2013.01); *B64C 2201/146* (2013.01); *B64C 2201/165* (2013.01); *B64D 2211/00* (2013.01); *Y02T 50/12* (2013.01); *Y02T 50/145* (2013.01); *Y02T 50/44* (2013.01); *Y02T 50/69* (2013.01)

(56) References Cited

U.S. PATENT DOCUMENTS

| | | | |
|---|---|---|---|
| D137,938 S | | 5/1944 | Maycen |
| 2,496,087 A | | 1/1950 | Fleming |
| 2,626,348 A | | 1/1953 | Nobles |
| 2,969,933 A | | 1/1961 | Vogt |
| 3,110,631 A | | 11/1963 | Carlton |
| 3,161,373 A | * | 12/1964 | Vogt .................... 244/2 |
| 3,165,280 A | | 1/1965 | Lee |
| 3,188,025 A | | 6/1965 | Moorehead |
| 3,346,718 A | | 10/1967 | Cooley et al. |
| 3,438,597 A | | 4/1969 | Kasper |
| 3,607,419 A | | 9/1971 | Keating, Jr. |
| D223,869 S | * | 6/1972 | Hurkamp .................... D12/337 |
| D232,711 S | * | 9/1974 | Kirchner .................... D12/335 |
| 3,839,860 A | | 10/1974 | Martin |
| 3,860,200 A | * | 1/1975 | Petrushka .................... 244/207 |
| 3,884,432 A | * | 5/1975 | Blanchard et al. .............. 244/15 |
| 3,937,424 A | | 2/1976 | Meier et al. |
| D239,274 S | * | 3/1976 | Snyder .................... D12/335 |
| 3,941,272 A | | 3/1976 | McLaughlin |
| 3,972,490 A | | 8/1976 | Zimmermann et al. |
| 4,023,617 A | | 5/1977 | Carlson et al. |
| 4,354,646 A | | 10/1982 | Raymer |
| 4,375,697 A | | 3/1983 | Visher |
| 4,403,755 A | | 9/1983 | Gutsche |
| 4,415,133 A | | 11/1983 | Phillips |
| 4,492,353 A | | 1/1985 | Phillips |
| 4,566,657 A | | 1/1986 | Grow |
| 4,568,043 A | | 2/1986 | Schmittle |
| 4,568,442 A | | 2/1986 | Goldsmith |
| 4,601,443 A | | 7/1986 | Jones et al. |
| 4,697,761 A | | 10/1987 | Long |
| 4,722,773 A | | 2/1988 | Plowman et al. |
| 4,742,977 A | | 5/1988 | Crowell |
| 4,768,738 A | | 9/1988 | Weinert |
| 4,781,341 A | | 11/1988 | Kasper |
| 4,863,813 A | | 9/1989 | Dyer |
| 4,907,764 A | | 3/1990 | Long |
| 4,928,317 A | | 5/1990 | Franchini |
| 4,958,289 A | | 9/1990 | Sum et al. |
| 5,047,298 A | | 9/1991 | Perry et al. |
| 5,078,338 A | * | 1/1992 | O'Neill et al. .................. 244/47 |
| 5,106,035 A | | 4/1992 | Langford, III |
| 5,112,009 A | | 5/1992 | Farineau |
| 5,131,605 A | | 7/1992 | Kress |
| 5,135,185 A | | 8/1992 | Adamson et al. |
| 5,178,968 A | | 1/1993 | Roche |
| 5,216,888 A | | 6/1993 | Kupiszewski et al. |
| 5,340,663 A | | 8/1994 | Buswell et al. |
| 5,356,094 A | | 10/1994 | Sylvain |
| 5,374,010 A | | 12/1994 | Stone et al. |
| 5,379,969 A | | 1/1995 | Marx et al. |
| 5,465,170 A | | 11/1995 | Arimoto |
| 5,518,205 A | | 5/1996 | Wurst et al. |
| 5,531,402 A | | 7/1996 | Dahl |
| 5,547,777 A | | 8/1996 | Richards |
| 5,652,750 A | | 7/1997 | Dent et al. |
| 5,678,783 A | | 10/1997 | Wong |
| 5,709,961 A | | 1/1998 | Cisar et al. |
| 5,710,652 A | | 1/1998 | Bloom et al. |
| 5,808,472 A | | 9/1998 | Hayes |
| 5,810,284 A | * | 9/1998 | Hibbs et al. .................... 244/13 |
| 5,839,699 A | | 11/1998 | Bliesner |
| 5,842,666 A | | 12/1998 | Gerhardt et al. |
| 6,070,833 A | | 6/2000 | Burke et al. |
| 6,076,766 A | | 6/2000 | Gruensfelder |
| 6,126,111 A | | 10/2000 | Burcham et al. |
| 6,178,754 B1 | | 1/2001 | Dujarric |
| 6,296,957 B1 | | 10/2001 | Graage |
| 6,347,719 B1 | | 2/2002 | Rosen et al. |
| 6,364,251 B1 | | 4/2002 | Yim |
| 6,450,447 B1 | | 9/2002 | Konrad et al. |
| 6,550,717 B1 | | 4/2003 | MacCready et al. |
| 6,568,633 B2 | | 5/2003 | Dunn |
| D476,289 S | * | 6/2003 | Kendall et al. ............... D12/319 |
| 6,931,247 B2 | | 8/2005 | Cox et al. |
| 2003/0141409 A1 | * | 7/2003 | Lisoski et al. .................. 244/13 |
| 2004/0069897 A1 | | 4/2004 | Corcoran |
| 2008/0001028 A1 | * | 1/2008 | Kendall et al. ............... 244/75.1 |

FOREIGN PATENT DOCUMENTS

| | | |
|---|---|---|
| DE | 1 215 222 | 4/1966 |
| DE | 28 03 041 | 8/1979 |
| DE | 43 08 758 A1 | 9/1994 |
| DE | 296 16 989 U1 | 1/1997 |
| EP | 0967676 A1 | 12/1999 |
| FR | 1446609 | 9/1965 |
| FR | 2 721 458 | 12/1995 |
| GB | 375515 | 6/1932 |
| GB | 2 082 995 A | 3/1982 |
| JP | 04325395 | 11/1992 |
| JP | 11-348894 | 12/1999 |
| WO | WO 95/04407 | 2/1995 |
| WO | WO 95/12237 | 5/1995 |
| WO | WO 97/33790 | 9/1997 |
| WO | WO 98/35506 | 8/1998 |
| WO | WO 99/13598 | 3/1999 |
| WO | WO 99/23769 | 5/1999 |
| WO | WO 99/34467 | 7/1999 |
| WO | WO 99/65097 A1 | 12/1999 |

OTHER PUBLICATIONS

"NASA Tests Prototype of Electric-Powered 'Flying Yardstick'," Los Angeles Times, Nov. 20, 1998, Section B4, col. 2.*
Brown, Stewart F., "Eternal Airplane- A Solar Electric Wing Takes Off," Popular Science, Apr. 1994, pp. 70-75 and 100.*
Flittie, K. and Curtin, B., "Pathfinder Solar-Powered Aircraft Flight Performance," AIAA Paper 98-4446, Aug. 1998, pp. 618-632.
Djuknic, G. M., Freidenfelds, J., and Okunev, Y., "Establishing Wireless Communications Services via High-Altitude Aeronautical Platforms: A Concept Whose Time Has Come?," IEEE Communications Magazine, Sep. 1997, pp. 128-135.

(56) References Cited

OTHER PUBLICATIONS

"Lockheed Studies Solar-Powered Surveillance Aircraft," Aviation Week and Space Technology, Dec. 6. 1982, p. 120.
Aronson, Robert B, "Solar-Powered Planes," Machine Design, Feb. 7, 1985, vol. 57, p. 32.
"NASA Tests Prototype of Electric-Powered 'Flying Yardstick'" Los Angeles Times, Nov. 30, 1998, p. B4.
Williams, Arthur L., "A New and Less Complex Alternative to the Handley Page Slat," 452 Journal of Aircraft, Mar. 1986, pp. 200-206, vol. 23, New York, USA.
Brown, Stewart F., "Eternal Airplane—A Solar Electric Wing Takes Off," Popular Science, Apr. 1994, pp. 70-75 and 100.
Walter, Katie, "The Unitized Regenerative Fuel Cell," Science & Technology Review, May 1997, www.llnl.gov/str/05.97.html, pp. 1-5.
Mitlitsky, Fred, "Advanced Power Systems for Exoskeletons," Presented at Exoskeletons for Human Performance Augmentation (EHPA) Workshop, Dulles, VA, Mar. 1-3, 2000, pp. 1-21.
"What Are Fuel Cells", www.e-sources.com/fuelcell/fcexpin, pp. 1-5.
Nice, Karim; "How Fuel Cells Work", www.howstuffworks.com/fuel-cell.htm/printable, pp. 1-7.
Answers.com, "Fuel Cell" www.answers.com/fuel+cell&r=67, pp. 1-9.
International Search Authority "International Search Report and Written Opinion of the International Searching Authority" for related application PCT/US04/19746 (a PCT application corresponding to a parent, U.S. Appl. No. 10/600,258, of present application), Dec. 23, 2005.

* cited by examiner

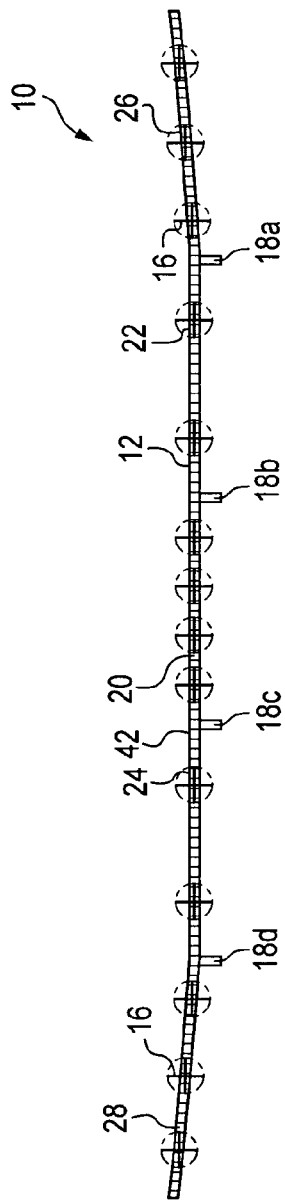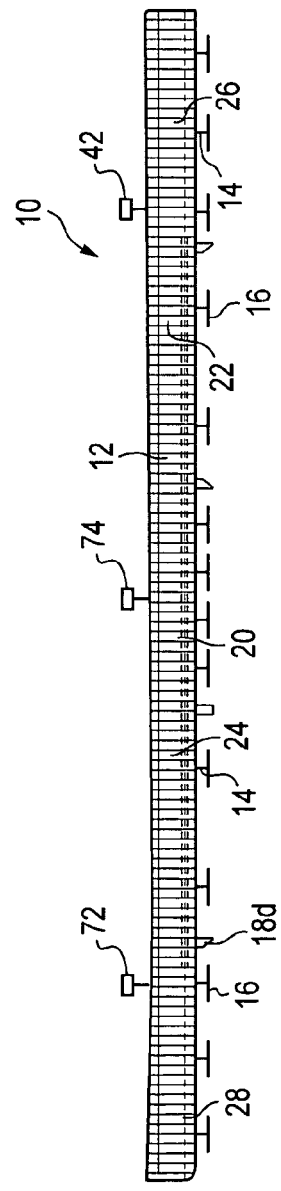

ACTIVE DIHEDRAL CONTROL SYSTEM FOR A TORISIONALLY FLEXIBLE WING

The present invention relates to aircraft. More particularly, the present invention relates to aircraft having unique control mechanisms, and related methods of controlling an aircraft. The present application is a divisional application of U.S. patent application Ser. No. 11/732,109, filed Apr. 2, 2007, now U.S. Pat. No. 7,802,756, which is a continuation in part of U.S. patent application Ser. No. 10/310,415, filed Dec. 5, 2002, now U.S. Pat. No. 7,198,225, which is a divisional application of U.S. patent application Ser. No. 09/527,544, filed Mar. 16, 2000, now abandoned, which claims priority from U.S. provisional patent application Ser. No. 60/182,165, filed Feb. 14, 2000, each of which is incorporated herein by reference for all purposes. U.S. patent application Ser. No. 11/732,109, filed Apr. 2, 2007, now U.S. Pat. No. 7,802,756, is also a continuation in part of U.S. patent application Ser. No. 10/600,258, filed Jun. 20, 2003, now U.S. Pat. No. 7,281,681, which is a continuation in part of U.S. patent application Ser. No. 10/073,828, filed Feb. 11, 2002, now abandoned, which is a divisional of U.S. patent application Ser. No. 09/826,424, filed Apr. 3, 2001, now U.S. Pat. No. 6,550,717, which claims priority from U.S. provisional application Ser. No. 60/241,713, filed Oct. 18, 2000, and which also claims priority from U.S. provisional application Ser. No. 60/194,137, filed Apr. 3, 2000, each of which is incorporated herein by reference for all purposes.

This invention was made with government support under ERAST JSRA Contract NCC-04004 awarded by NASA. The United States Government has certain rights in the invention.

BACKGROUND

Aircraft are used in a wide variety of applications, including travel, transportation, fire fighting, surveillance and combat. Various aircraft have been designed to fill the wide array of functional roles defined by these applications. Included among these aircraft are balloons, dirigibles, traditional fixed wing aircraft, flying wings and helicopters.

One functional role that a few aircraft have been designed to fill is that of a high altitude platform. Operating from high, suborbital altitudes, such aircraft can monitor weather patterns, conduct atmospheric research and surveil a wide variety of subjects.

Three high altitude aircraft that have been constructed are the well-known Pathfinder, Centurion and Helios aircraft, which have set numerous flight records. The basic design concepts underlying these aircraft are discussed at length in U.S. Pat. No. 5,810,284, which is directed toward an unswept flying wing aircraft having a very high aspect ratio and a relatively constant chord and airfoil. While these aircraft are quite noteworthy for their long term flight potential, they do have limits in their available power and payload.

Such aircraft may be designed as flying wings that include a number of self-sufficient wing sections, each generating enough lift to support its own weight. To minimize weight, the aircraft structure is highly flexible, and is designed to withstand only relatively small torsional loads and moderate bending loads along its lateral axis (i.e., its wingspan). The aircraft's wing has little or no dihedral while on the ground. However, due to high flexibility, the large aspect ratio and the constant chord, in-flight wing loads tend to cause the wing to develop a substantial dihedral angle at the wingtips, which may not be optimal for a given wing strength. Thus, there is a tradeoff between the structural weight of the aircraft and the desirability of the wing shape.

There is an inherent relationship between an aircraft's overall airframe geometry and the design of its airfoils and control surfaces. Typical aircraft offset negative (i.e., nose-down) pitching moments through the use of tail moments (i.e., vertical forces generated on empennage horizontal surfaces and elevators, with a moment arm that is the distance from the wing center of pressure to the empennage vertical center of pressure).

To minimize the torsional loads, the Pathfinder, Centurion and Helios aircraft include "wing-mounted elevators" along a substantial portion of their trailing edges (i.e., the trailing edges of each flying wing segment). These aircraft do not include rudders or ailerons, and the wing-mounted elevators are not designed as elevons (i.e., they cannot move in contrary directions near opposite wingtips). Roll is passively controlled by the dihedral of the wing, which is developed in flight. Sideslip is also passively controlled by the dihedral of the wing. As discussed above, the allowable wing dihedral is limited by the structural strength of the wing.

Given the broad range of functions that a long-duration, suborbital platform has the potential to perform, it is desirable to design such high-altitude platforms to be capable of handling larger payloads and power demands. The platforms could be variations of existing platforms, such as larger variations of the Pathfinder, Centurion and Helios aircraft, but such platforms will likely have to handle increased bending loads along the wing as such larger aircraft have to react against dihedral-causing forces over a larger wingspan.

There exists a definite need for a multipurpose aircraft that can remain airborne for long durations. Preferably, such an aircraft should be able to operate up to very high, suborbital altitudes. Importantly, it is desirable for such an aircraft to have the capability to meet larger payload and/or power supply requirements. Furthermore, there exists a need for such an aircraft to be structurally light weight and well controlled. Various embodiments of the present invention can meet some or all of these needs, and provide further, related advantages.

SUMMARY OF THE INVENTION

The present invention addresses the needs mentioned above by providing an aircraft that can operate at high altitudes, carry substantial payloads, and/or remain aloft for long periods of time.

The aircraft of the invention typically includes a laterally extending wing, a plurality of pitch-control devices, and a control system configured to control the plurality of pitch-control devices. Each pitch-control device is mounted at a separate lateral location along the wing. Each pitch-control device is configured to apply pitch-control torque at its lateral location, and the wing is characterized by a torsional flexibility high enough for each pitch-control device to separately and substantially control localized pitch at its lateral wing location, i.e., to a degree substantial enough to be significant for flight control.

The pitch-control device may feature a body, e.g., a boom, connecting the wing to a control surface aft of the trailing edge of the wing. Advantageously, the control surface is positioned at a distance from the wing adequate to provide the aerodynamic forces from the control surface with a pitching effect on the wing to cause changes in the local lift that dominate (i.e., are much larger than) the changes in lift that occur from the redirection of air by the control surface (i.e., the flap effect), over the entire flight envelope. Thus, aileron reversal is not an issue.

The invention further features that the control system is configured to operate the pitch-control devices under protocols that will actively control wing dihedral. Advantageously, under such predetermined protocols, a highly flexible wing can be used while limiting the risk of excessive wing bending.

Other features and advantages of the invention will become apparent from the following detailed description of the preferred embodiments, taken in conjunction with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

BRIEF DESCRIPTION OF THE DRAWINGS

FIG. 1 is an elevational view of an aircraft embodying the invention.

FIG. 2 is a plan view of the aircraft depicted in FIG. 1.

DETAILED DESCRIPTION OF THE PREFERRED EMBODIMENTS

Figure 3:
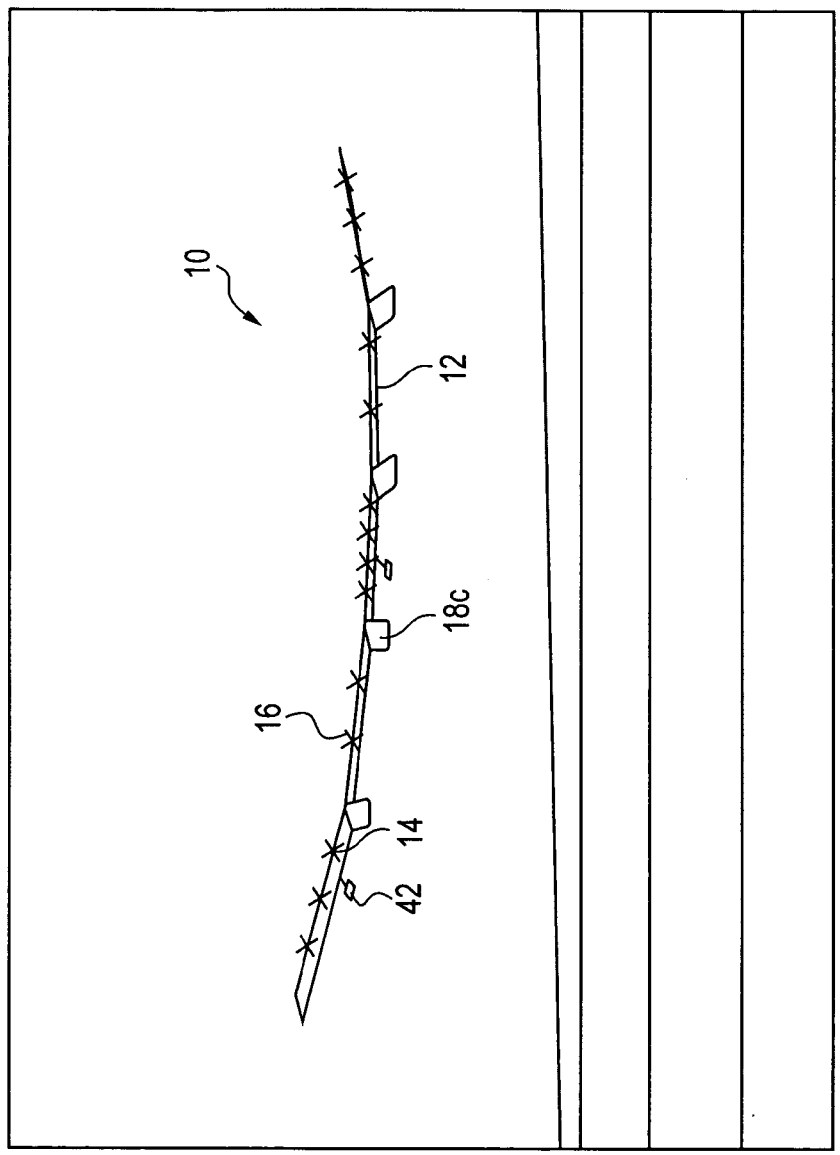
FIG. 3 is a perspective view of the aircraft depicted in FIG. 1, in a flexed position that creates moderate dihedral typical of loading under mild flight conditions.

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but rather it is intended to serve as a particular example thereof.

In accordance with the present invention, a number of preferred embodiments of an aircraft of the present invention are of designs similar to those of the Pathfinder, Centurion and/or Helios aircraft, as mentioned above in the Background of the Invention. While the embodiments' designs, and variations of them, are described below, further details useful for the practicing of this embodiment of the invention are provided in U.S. Pat. No. 5,810,284, which is incorporated herein by reference for all purposes. Nevertheless, it is to be understood that designs for other embodiments of the invention can differ substantially from the described aircraft.

Like the Pathfinder, Centurion and Helios aircraft, the preferred embodiments may be flying wings. These embodiments include a plurality of laterally connected, wing segments that preferably can each support their own weight in flight so as to minimize inter-segment loads, and thereby minimize required load-bearing structure. These embodiments have aircraft control systems configured to control the flexible development of wing dihedral during flight, and thereby further control inter-segment loads.

The Pathfinder, Centurion and Helios aircraft had trailing-edge control surfaces configured as trailing edge flaps (or "wing-mounted elevators" on the trailing edge of the wing). These control surfaces were not configured to act differentially. The coordination of the wing trailing edge control surfaces to prevent contrary movement on different portions of the wing was not utilized. The torsional flexibility of the Pathfinder, Centurion and Helios aircraft made the use of such control surfaces relatively impractical. Lacking the torsional rigidity of a normal aircraft, the Pathfinder, Centurion and Helios aircraft could suffer from significant control reversal problems if the control surfaces operated as ailerons. Under some circumstances, these difficulties also might affect the operation of the control surfaces as elevators. Thus, the control reversal issue potentially limited the operability of the aircraft.

For example, a downward control surface deflection on a normal, torsionally stiff wing, would typically be expected to cause additional airfoil section lift (an effect that will be hereinafter referred to as a "flap effect"). However, such a deflection will likely cause a significant nose-down pitching (twisting) moment on the wing, which on a torsionally flexible wing can lead to a decreased angle of attack, and thereby a reduction in overall lift (an effect that will be hereinafter referred to as a "pitch effect"). Under various flight conditions, a control surface on the trailing edge of a torsionally flexible wing can experience one, the other and/or both of these two contrary effects to a significant degree.

As a result, the response to a movement of the control surface on a highly flexible (in torsion) winged aircraft can be unpredictable. Moreover, over the flight envelope (e.g., through variations in flight speed), the response can vary between having one of the effects dominate, having the other dominate, having the two cancel each other out, and having the two cyclically operate with one lagging the other to drive the wing in a potentially unstable forced vibration (i.e., flutter) having both bending and torsional components.

With reference to FIGS. 1-3, a first preferred embodiment is a flying wing aircraft 10, i.e., it has no fuselage or empennage usable to control the overall pitch of the aircraft (as a typical aircraft would have). Instead, it consists of an unswept, laterally extending wing 12 similar to that of the Centurion aircraft, having a substantially consistent airfoil shape and size along the wingspan. Fourteen motors 14 are situated at various locations along the wingspan, each motor driving a single propeller 16 to create thrust. Four vertical fins 18a-18d, or pods, extend down from the wing, with landing gear at their lower ends.

The aircraft 10 is longitudinally divided into preferably five modular wing segments sequentially located along the lateral wingspan. These include a center segment 20, left and right intermediate segments 22, 24, and left and right wingtip segments 26, 28. These wing segments preferably range from 39 to 43 feet in length, and have a chord length of approximately eight feet. Alternative variations of the embodiment may be highly flexible flying wing aircraft that are unitary (i.e., not segmented), but are nevertheless highly flexible.

Figure 4:
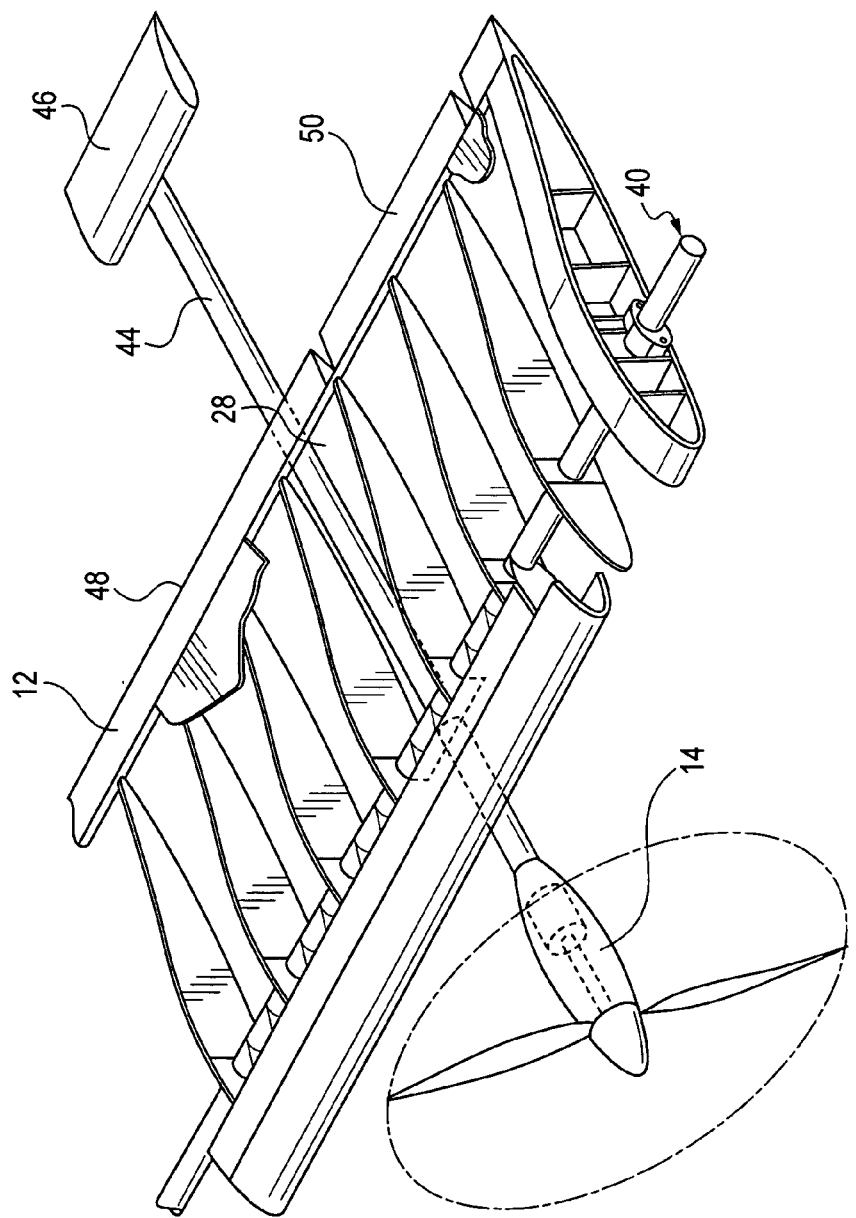
FIG. 4 is a perspective, cutaway view showing the construction of one portion of one wing segment of the wing of the aircraft depicted in of FIG. 1.

With reference to FIGS. 2, 3 and 4, one or more of the wing segments of the aircraft 10, and preferably at least three wing segments (as depicted) (and/or up to and including all of the wing segments) each include a pitch-control device 42, each pitch-control device being mounted at a separate lateral location along the wing. The pitch-control device is preferably a boom 44 extending longitudinally aft and holding a preferably horizontal control surface 46 in a position preferably aft of the trailing edge of the wing 12. For the purposes of this application, it should be understood that a "horizontal" surface is one extending in a direction having a horizontal component, that is adequately horizontal to impart control forces having a relevant vertical component. In alternative embodiments, the pitch-control device could include both a fixed horizontal surface and an active control surface.

The three wing segments having pitch-control devices are preferably an inboard wing segment (e.g., the center segment 20) and two outboard wing segments (e.g., the end segments 26, 28). Thus, the flying wing preferably includes at least 3 pitch control devices, which are preferably located symmetrically across the wing.

Each such pitch-device control surface 46 is configured for rotationally deflecting relative to the boom 44 such that a controllable, preferably vertical aerodynamic force is applied to the boom aft of the trailing edge of the wing. The force applied to the boom is preferably normal to the longitudinal dimension of the boom, and at a distance from the wing segment on which it is mounted, such that a torsional force is applied to the wing segment at or about the lateral location to which the boom structurally connects to the wing segment.

Moreover, the wing 12 is characterized by enough torsional flexibility in the lateral locations of each pitch-control device 42 to separately control localized pitch of the wing at and/or near its lateral wing location. In this application, the terminology "separately control" should be understood to mean that the pitch-control devices are physically independent such that each could in theory be commanded to operate in a manner different from the others.

This control over localized pitch is to a degree substantial enough to be significant for flight control (i.e., for control of the response of the aircraft structure to aerodynamic forces, so as to change the aircraft structural configuration (e.g., wing dihedral and/or bending load) and/or the aircraft flight or orientation). The position and configuration of each pitch-control device preferably limits any flap effect it has on the wing segment (in response to deflection of the control surface) such that the pitch effect is dominant over the entire flight envelope of the aircraft. In other words, the change in vertical force from movements of the pitch-control device control surface, are significantly less than the change in lift experienced by the wing due to the resulting change in local wing pitch.

Each pitch-control device boom 44 connects the control surface 46 to the wing 12 at a distance aft of both the spar 40 and the trailing edge 48 of the wing adequate to cause the control surface pitch effect to dominate the control surface flap effect. This is distinctive from a normal aircraft, for which wing-mounted control surfaces are intended to operate using a dominant flap effect.

Optionally (as depicted in FIG. 4), additional, flap-effect control surfaces 50 could be incorporated into the trailing edge of the wing, particularly in locations structurally close to (e.g., within a spanwise area torsionally affected and/or controlled by) a pitch-control device 42. These trailing-edge control surfaces could be limited in use to flight regimes where in their response would be predictable, or could be used in concert with a pitch-control device to produce desired effects (e.g., the trailing edge control surface could control lift while the pitch control device limits the wing pitch resulting from movements of the trailing edge control surface). Alternatively, the pitch-control devices may be the only control surfaces (or the only horizontal control surfaces) on the aircraft.

The overall length of the pitch-control device as measured back from the elastic axis of the wing, and its control surface size, may be experimentally or analytically determined to meet the criteria of minimizing overall weight and drag, while providing for the pitch effect to be the dominant effect over the entire desired flight envelope. Possible pitch-device lengths that might be considered, as multiples of the wing fore-and-aft length (i.e., chord length), include 1.5 and 3.

Thus, the aircraft of this embodiment might have a chordwise length of roughly 20 feet, with a wing segment chordwise length of eight feet, and a wingspan of approximately 200 feet. The structure is configured to be lightweight, with significant flexibility in vertical bending (allowing for significant dihedral bending) and spanwise torsion (allowing for significant relative pitching).

Figure 5:
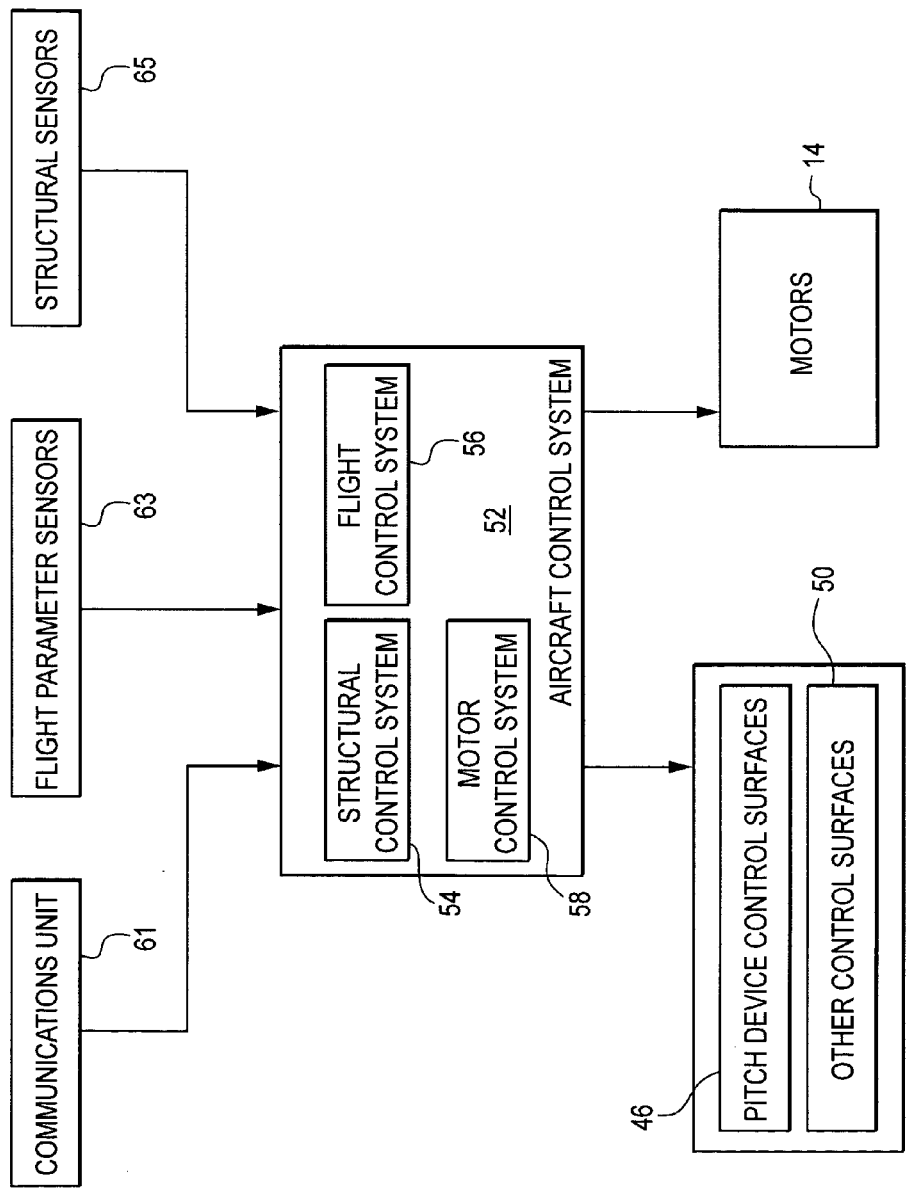
FIG. 5 is a block diagram showing a control system and related components from the aircraft illustrated in FIG. 1.

With reference to FIGS. 2, 4 and 5, the embodiment includes an electronic aircraft control system 52 configured to control the operation of the aircraft. The aircraft control system includes a structural control system 54 configured to control structural bending of the aircraft, and a flight control system 56 configured to control the flight of the aircraft. Because these two functions may be significantly interrelated, the structural control system and flight control system are likely to significantly interact within the overall aircraft control system 52.

Both the structural control system 54 and the flight control system 56 receive data from numerous sources. One such source is a communications unit 61 configured to receive instructions from a ground controller (e.g., a ground-based pilot). Another source is a plurality of flight parameter sensors 63, preferably including one or more of the following sensors: a positional sensor (e.g., a GPS), a heading sensor, a pitch sensor, a roll sensor, a yaw sensor, an altimeter, a flight speed sensor, a vertical speed sensor, a slip sensor, a pitch rate sensor, a roll rate sensor, and a yaw rate sensor. A third source is a plurality of structural sensors 65, preferably including one or more of the following sensors: vertical wing bending sensors, fore-and-aft wing bending sensors, wing torsion sensors, motor speed and/or thrust sensors, control surface deflection and/or force sensors, and solar sensors configured to detect the exposure of the structure to sunlight. Each of these sensors is of a type either known in the art (e.g., strain gauges and positional sensors), or that can be formed with a combination of known sensors.

In some cases, one or more sensors of one type may serve the function of the sensor of another type. For example, a plurality of pitch sensors and/or pitch rate sensors laterally positioned along the wing may provide data to analytically determine wing torsion, which might otherwise be detected with strain gauges.

The structural control system 54 and the flight control system 56 may each contribute to command instructions sent to a number of aircraft systems. The systems receiving command instructions to control their operation include the control surfaces (e.g., pitch-control device control surfaces 46, and flap-effect control surfaces 50) and the motors. As noted above, in some cases the structural sensors will be of a type to sense the operation of the control devices (e.g., the control surfaces and/or the motors).

Using the aircraft control system 52 and the pitch-control devices 42, aircraft dihedral is controlled by having the structural control system 54 cause aircraft control system commands to be sent to the pitch-control devices to initiate control movements of their control surfaces 46 using a protocol that controls the pitch of their respective lateral locations on the wing, and relatedly affect their wing segments and/or nearby portions thereof (and possibly the pitch of nearby wing segments). In particular, outboard pitch-device control surfaces 72 are directed to actuate downward (i.e., trailing edge down), causing their respective wing segments 26, 28, or portions of their respective wing segments to pitch downward (i.e., leading edge down) and thereby decrease the overall lift generated by the respective outboard wing segments.

Simultaneously, inboard pitch-device control surfaces 74 are directed to actuate upward, causing their respective wing segments, or portions of their respective wing segments 20 to pitch upward and thereby increase the overall lift generated by the respective inboard wing segments. As a result, with inboard lift increased and outboard lift decreased, overall wing dihedral may be controllably reduced, eliminated, and/or controlled to achieve desired wing configurations and desired wing stress levels.

The aircraft control system is thereby configured to control the plurality of pitch-control devices under a protocol (i.e., a detailed plan or procedure) that controls wing dihedral according to a predetermined program. Such a program will typically include dihedral limits (e.g., maximums dictated by flight efficiency and structural limits, and optionally minimums dictated by flight control issues, possibly varying over the entire flight envelope), and dihedral schedules (such as ones based on maximizing the exposure of wing solar cells to sunlight, ones based on optimizing the positions of onboard instrumentation, or ones based on stability and control parameters). The protocol may include control inputs that are symmetric, such as ones to increase or decrease dihedral, control inputs that are inverted on opposite sides, such as ones to roll the aircraft, and possibly even control inputs that are asymmetric.

In order to optimize flight efficiency by reducing drag, the aircraft control system dihedral schedule may be configured (i.e., the protocol may include command procedures) to cause the dihedral to be less when the sun is high in the sky, or when it is night. This allows the aircraft to optimize the tradeoff between power generation and flight efficiency. To accomplish this end, the control system determines a dihedral configuration to increase the power generated by solar cells, should they be present. This can be done by simply reading a clock signal from a clock within the aircraft control system and adjusting the dihedral (and possibly the heading) based on the anticipated light conditions. More preferably, the control system can detect the light conditions, either through signals from light sensors, or from indications of the power levels generated by one or more of the solar cells.

As suggested above, in some situations it might be desirable to increase wing dihedral. To do so, the reverse of the above-recited operation is conducted. More particularly, outboard pitch-device control surfaces 72 are directed to actuate upward, causing their respective wing segments, or portions of their respective wing segments, to pitch upward and thereby increase the overall lift generated by the respective outboard wing segments. Simultaneously, inboard pitch-device control surfaces 74 are directed to actuate downward, causing their respective wing segments, or portions of their respective wing segments, to pitch downward and thereby decrease the overall lift generated by the respective inboard wing segments.

As a result of the above design, the preferred embodiment of the aircraft is light, travels at relatively slow air speeds, and has a configuration controllable to limit stresses on its individual components. Optionally, the control system may receive input from sensors configured to detect the configuration (e.g., the relative position, orientation, bending and/or torsion) of the aircraft and/or individual wing segments thereof. Thus, the aircraft control system may actively control the aircraft configuration to be maintained within structural safety limits (e.g., for the bending stresses to be maintained within safety limits) and within an optimum flight configuration range, even when the aircraft encounters undesirable flight conditions such as turbulence.

Preferably the pitch-control devices 42 are each paired with (i.e., located substantially aft of) a motor 14, thus potentially limiting the effects of drag from the pitch-control device on the wing 12 (i.e., the use of paired motors and pitch-devices limits the shear forces and fore-and-aft bending of the wing due to moment arms between the thrust of the nearest motor(s) and the drag of the pitching device). The depicted outboard pitch-control devices are paired with motors. Optionally, the wing may include additional motors that are not paired with pitch-control devices (as depicted for the inboard pitch-control device). The motors may optionally be controlled by a motor control system 58, (which may be part of the aircraft control system) that is configured to control the operation of the motors such that the unpaired motors (i.e., motors not paired with a pitch-control device) are operated at a lower thrust level than the paired motors, the difference being at or about the anticipated or actual level of pitch-device drag, which may vary by flight condition and control surface position. Likewise, two or more motors near an unpaired pitch-control device may be controlled by the aircraft system controller to provide relatively increased thrust in a proportional amount based on their lateral positions relative to the pitch-control device.

As a result, the motor control system is configured to separately control the thrust from the plurality of motors to reduce fore-and-aft wing loads between the motors. Optionally, the motor control system may optimize this function using flight data and sensory information regarding wing strain, actual thrust and actual structural configuration (e.g., wing bending, wing torsion and other related parameters).

The aircraft 10 controls yaw, and thereby turns, using differential thrust from varied motor torque on the propellers 16. It uses a combination of sideslip and dihedral to control bank angle. Optionally, the pitch-control devices could be used to create varied lift over the wingspan, and thereby control bank angle without large side slip issues. Other known methods or mechanisms for creating differential thrust could also be used.

The aircraft relies upon its large wingspan and relatively low velocities to avoid yaw instability. Roll may be controlled passively by the wing being maintained with a positive angle of dihedral, and/or by using the pitch-control devices to create differential lift across the wingspan.

The aircraft may further include inter-segment hinge mechanisms and hinge locks, as described in U.S. patent application Ser. No. 10/310,415, filed Dec. 5, 2002, which is incorporated herein by reference for all purposes. The structural control system may further control the pitch-control devices to actuate the inter-segment hinge mechanisms (i.e., acting as hinge actuators), as described in that application. The hinge locks (i.e., hinge-rotation locks) can be either within the hinge mechanisms, or otherwise controlling them. When a rotational lock is in an unlocked configuration, hinge actuators allow the relative rotation of respective wing segments. When the rotational lock is in a locked configuration, the hinge mechanism is restrained, and the respective wing segments are prevented from rotating with respect to each other, thereby maintaining the wing's dihedral configuration.

The aircraft may optionally feature additional, non-aerodynamic mechanisms (as described in the above-noted application), configured to affect the local wing pitch (i.e., pitch-control devices) and/or to control the rotation of the hinge mechanisms, thereby adding further controllability to the wing configuration and/or the operation of the hinge mechanisms. These mechanisms may include CG-movement devices (i.e., devices configured to change the center of gravity in a particular area of the wing so as to affect its pitch and/or roll). It is preferable that there be a symmetric arrangement of hinge mechanisms on the aircraft, along with a symmetric arrangement of pitch-control devices.

Additional configurations, such as aircraft configured to deflect into W-shapes or M-shapes are also within the scope of the invention. Such configurations having alternating positive and negative dihedral can reduce wing loading for flight conditions in which it is desirable to have significant side exposure of the wing surfaces (such as when the sun is low on the horizon). Furthermore, aircraft with only two pitch-control devices or only one pitch-control device are also within the possible scope of the invention, particularly when combined with a structural control system implementing protocols as described above.

While the described embodiments of active dihedral control are employed on an aircraft having numerous, flexible, non-swept wing segments of constant airfoil and chord, they can likewise be employed on other aircraft designs including conventional aircraft, and even biplanes.

Figure 6:
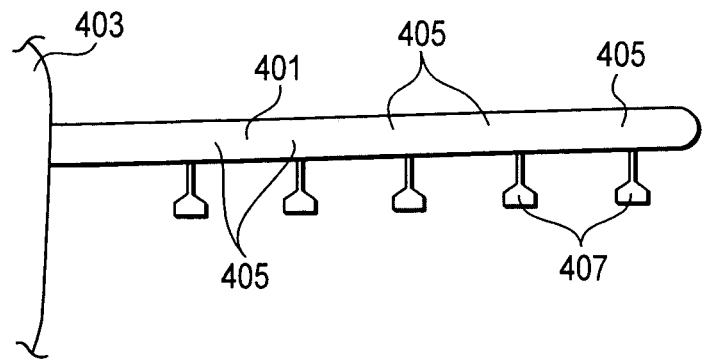
FIG. 6 is a partial plan view of a second aircraft embodying the invention.

More particularly, with reference to FIG. 6, another embodiment may be a conventional aircraft provided with a flexible wing 401, which supports a fuselage 403, and includes a number of highly flexible regions 405 capable of significant independent wing torsion. Each region has a pitch-control device 407 that controls the pitch of that region, and reacts any negative pitching moments of that region's cambered airfoil. The aircraft wing 401 will preferably include at least one pitch-control device 407 on each side of the fuselage 403 in a symmetric formation. Preferably (though not necessarily), the fuselage carries an empennage (not shown) that includes typical horizontal control surfaces, and/or other fuselage-mounted pitch-control surfaces (e.g., a canard).

Preferably, the primary function of the pitch-control devices 407 is controlling and/or preventing local wing torsion and bending, but overall flight control can also be a primary or secondary function. Overall aircraft pitching moments can also be reacted by the fuselage-mounted pitch-control surfaces. An aircraft control system preferably controls both the pitch-control devices and any fuselage-mounted pitch-control surfaces to those ends, and preferably receives input from various sensors, as described with reference to the first embodiment.

While the above-described pitch-control devices actively control local wing pitch, another embodiment of the invention uses passive controls (i.e., pitch-limiting devices) so as to allow the use of ailerons on a highly flexible wing without experiencing aileron reversal. While an aircraft with a fuselage is described in the embodiment below, other embodiments may be of other configurations, such as flying wings like those described above.

Figure 7:
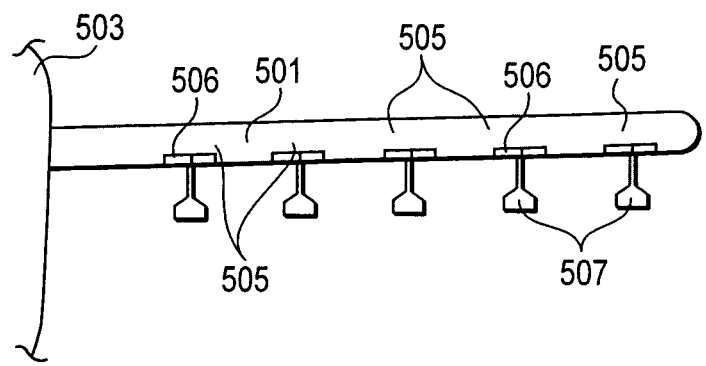
FIG. 7 is a partial plan view of a third aircraft embodying the invention.

With reference to FIG. 7, another embodiment may be a conventional aircraft provided with a highly flexible laterally extending wing 501, which supports a fuselage 503, and includes a number of highly flexible regions 505 capable of significant independent wing torsion. A plurality of ailerons 506 are mounted at various lateral aileron-locations in the highly flexible regions along the wing.

A plurality of pitch-limiting devices 507 are mounted at separate lateral pitch-limiting-locations along the wing. Each pitch-limiting device is configured to apply a pitch-limiting torque at its pitch-limiting-location. Each pitch-limiting-location is proximate the aileron-locations of one or more ailerons. Thus, each region has a pitch-limiting device 507 that limits the pitch of that region in response to aileron deflection. The aircraft wing 501 will preferably include at least one pitch-limiting device 507 on each side of the fuselage 403 in a symmetric formation. Preferably (though not necessarily), the fuselage carries an empennage (not shown) that includes typical horizontal control surfaces, and/or other fuselage-mounted pitch-control surfaces (e.g., a canard).

It should be understood that a wing that is uniformly (and highly) flexible can be considered as having a number of highly flexible regions. The term highly flexible should be understood to represent a level of torsional flexibility wherein but for any pitch-limiting devices (i.e., if they weren't there), one or more ailerons would experience aileron reversal over some portion of the flight envelope.

While the pitch-limiting devices could be active horizontal control surfaces controlled by a control system to limit wing pitch, or a combination of a control surface and a fixed horizontal surface, preferably the pitch-limiting devices include only one or more fixed horizontal surfaces mounted aft of the wing. More particularly, each pitch-limiting device preferably includes a body (e.g., a boom) connecting the wing to a fixed surface aft of the trailing edge of the wing at a distance adequate to cause the flap effect of the proximate ailerons to dominate the pitch effect over the entire flight envelope. The primary function of the pitch-limiting devices 507 is controlling and/or preventing local wing torsion and bending, and thereby allowing ailerons to function properly without experiencing aileron reversal.

Advantageously, the features described above with respect to the various embodiments can provide various advantages. By allowing for high torsional flexibility, torsion-carrying wing structure can be limited, reducing the weight of the aircraft and thereby potentially increasing its payload capacity. Moreover, by controlling wing bending loads, wing spar weight can be reduced. Furthermore, by providing control over the structure, potentially expanded flight envelopes are available to the aircraft. Improved stability and control may be obtainable using controlled wing shape (e.g., dihedral), as well as improved flutter characteristics (which again provide for expanded flight envelopes). Moreover, the increased structural weight of the devices may be partially offset by the elimination of ailerons and/or wing-mounted elevators.

From the foregoing description, it will be appreciated that the present invention provides a number of embodiments of a lightweight aircraft capable of both stationkeeping and flight over a wide range of speeds, while consuming low levels of power, for an extended period of time, while supporting an unobstructed communications platform, and while exhibiting simplicity and reliability Other embodiments within the scope of the invention include devices comprising forward extending booms configured with canards, and CG-movement devices. Likewise, other embodiments of the invention could have other numbers of wing segments, including variations with an even number of wing segments (e.g., six wing segments), and other numbers of motors. For example, an embodiment similar to the Helios aircraft might be configured with six wing segments, 10 motors, and anywhere from two to six (or possibly more) independent pitch-control devices. Likewise, a simple embodiment might include three wing segments with one to three motors and two or three (or perhaps even one) independent pitch-control devices, or might even be a very long unsegmented wing with one or more motors and a plurality of independent pitch-control devices.

While a particular form of the invention has been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the invention. Accordingly, the invention is not intended to be limited by the above discussion, and is defined with reference to the following claims.

We claim:

1. A flying wing aircraft, comprising:
   a laterally extending wing having a spanwise axis;
      wherein the wing has high torsional flexibility about the spanwise axis;
   a plurality of independently actuatable control surfaces;
      wherein the control surfaces are spaced apart along the span of the wing and connected thereto;
   a plurality of sensors connected to the wing; and
   a control system programmed to actively control the plurality of control surfaces based upon structural information data received from the plurality of sensors;
      wherein the control system independently actuates the control surfaces to alter local lift of wing portions at the location of each control surface in order to alter the dihedral of the wing.

2. The flying wing aircraft of claim 1, wherein the wing comprises a plurality of interconnected wing segments.

3. The flying wing aircraft of claim 1, wherein each control surface is a pitch-control device mounted on a boom extending aft from a trailing edge of the wing.

4. The flying wing aircraft of claim 1, wherein the plurality of sensors include at least one of a vertical wing bending sensor, a fore-and-aft wing bending sensor, and/or a wing torsion sensor.

5. The flying wing aircraft of claim 1, further comprising:
   a plurality of motors connected to the wing; and
   a plurality of propellers connected to the motors;
      wherein the control system independently controls the thrust of the plurality of motors in order to alter fore-and-aft bending of the wing in order to alter fore-and-aft wing loads between the motors.

6. The flying wing aircraft of claim 5, wherein each control surface is a pitch-control device mounted on a boom extending aft from a trailing edge of the wing; and
   wherein one of the plurality of motors and propellers is connected to a leading edge of the wing at the spanwise location of each of said booms.

7. The flying wing aircraft of claim 1, wherein the control surfaces comprise fixed and controllable horizontal surfaces.

8. The flying wing aircraft of claim 1, further comprising:
   a plurality of solar cells connected to the wing;
   wherein the solar cells provide power to the aircraft for flight.

9. An aircraft, comprising:
   a fuselage;
   a laterally extending wing having a spanwise axis;
      wherein the wing has high torsional flexibility about the spanwise axis;
   a plurality of independently actuatable control surfaces;
      wherein the control surfaces are spaced apart along the span of the wing and connected thereto;
   a plurality of sensors connected to the wing; and
   a control system programmed to actively control the plurality of control surfaces based upon structural information data received from the plurality of sensors;
      wherein the control system independently actuates the control surfaces to alter local lift of wing portions at the location of each control surface in order to alter the dihedral of the wing.

10. The aircraft of claim 9, wherein the wing comprises a plurality of interconnected wing segments.

11. The aircraft of claim 9, wherein each control surface is a pitch-control device mounted on a boom extending aft from a trailing edge of the wing.

12. The aircraft of claim 9, wherein the plurality of sensors include at least one of a vertical wing bending sensor, a fore-and-aft wing bending sensor, and/or a wing torsion sensor.

13. The aircraft of claim 9, further comprising:
   a plurality of motors connected to the wing; and
   a plurality of propellers connected to the motors;
      wherein the control system independently controls the thrust of the plurality of motors in order to alter fore-and-aft bending of the wing in order to alter fore-and-aft wing loads between the motors.

14. The aircraft of claim 13, wherein each control surface is a pitch-control device mounted on a boom extending aft from a trailing edge of the wing; and
   wherein one of the plurality of motors and propellers is connected to a leading edge of the wing at the spanwise location of each of said booms.

15. The aircraft of claim 9, wherein the control surfaces comprise fixed and controllable horizontal surfaces.

16. The aircraft of claim 9, further comprising:
   a plurality of solar cells connected to the wing;
   wherein the solar cells provide power to the aircraft for flight.

17. A method of controlling an aircraft comprising the steps of:
   providing an aircraft having:
      a laterally extending wing having a spanwise axis;
         wherein the wing has high torsional flexibility about the spanwise axis;
      a plurality of independently actuatable control surfaces;
         wherein the control surfaces are spaced apart along the span of the wing and connected thereto;
      a plurality of sensors connected to the wing;
      a control system programmed to actively control the plurality of control surfaces based upon structural information data received from the plurality of sensors; and
   independently actuating the control surfaces to alter local lift of wing portions at the location of each control surface to alter the dihedral of the wing.

18. The method of controlling an aircraft according to claim 17, wherein the wing has a large aspect ratio and a constant chord length; wherein the high torsional flexibility, large aspect ratio, and constant chord length cause the wing to develop a substantial dihedral angle at the wingtips in flight, further comprising the steps of:
   directing outboard control surfaces to actuate downwardly;
   directing inboard control surfaces to actuate upwardly; and
   deflecting the wing in the spanwise direction to reduce and/or eliminate wing dihedral.

19. The method of controlling an aircraft according to claim 18, further comprising the step of:
   directing outboard control surfaces to actuate downwardly;
   directing inboard control surfaces to actuate upwardly; and
   deflecting the wing in the spanwise direction to produce a negative dihedral.

20. The method of controlling an aircraft according to claim 17, further comprising the steps of:
   independently actuating the plurality of independently actuatable control surfaces to alter the local lift of wing portions to deflect the wing into a W-shape or M-shape along the spanwise axis.

* * * * *